United States Patent [19]

Bernard et al.

[11] 4,242,981

[45] Jan. 6, 1981

[54] APPARATUS FOR REBUILDING CYLINDRICAL OBJECTS

[76] Inventors: Philippe G. Bernard; Jack E. Bunn, both of P.O. Box 10086, Station 1, Houma, La. 70361

[21] Appl. No.: 42,570

[22] Filed: May 25, 1979

[51] Int. Cl.³ .............................................. B05C 11/00
[52] U.S. Cl. .................................. 118/47; 118/318; 118/321; 219/76.1; 266/57
[58] Field of Search ............... 118/47, 318, 321; 219/76.1; 266/57

[56] References Cited

U.S. PATENT DOCUMENTS

| 1,403,901 | 1/1922 | Field et al. ............................. 266/57 |
| 1,928,121 | 9/1933 | Anderson ............................... 266/57 |
| 2,077,277 | 4/1937 | Smith ..................................... 266/57 |
| 2,384,128 | 9/1945 | Nation ................................... 266/57 |
| 2,495,360 | 1/1950 | Young .................................... 266/57 |
| 3,563,791 | 2/1971 | Janco ..................................... 118/318 |
| 4,068,106 | 1/1978 | Shaputis ............................... 219/76.1 |
| 4,097,711 | 6/1978 | Banerjee ............................... 219/76.1 |

FOREIGN PATENT DOCUMENTS 562323  8/1958  Canada ................................ 219/76.1

*Primary Examiner*—Ronald H. Smith
*Assistant Examiner*—Sadie L. Childs

[57] ABSTRACT

Apparatus and method for rebuilding the internal surface of a cylindrical object, including a mandrel for supporting the object for rotation about its longitudinal axis, and a wire-fed welding torch positionable adjacent to the interior surface of the object. The welding torch is movable axially with respect to the object during the rotation thereof, so as to deposit material about the interior of the object.

9 Claims, 3 Drawing Figures

APPARATUS FOR REBUILDING CYLINDRICAL OBJECTS

BACKGROUND OF THE INVENTION

A. Field of the Invention

This invention relates to an apparatus for and method of rebuilding the interior of a cylindrical object by depositing material thereon.

B. Description of the Prior Art

Many types of apparatus include members having cylindrical bores or passages therethrough that are subjected to extreme wear. One such apparatus is an oilfield mud pump, which includes a stuffing box that is subject to being scored, pitted, and eroded by the action of the drilling fluids pumped therethrough. When the stuffing box becomes damaged, it is necessary either to replace it or to remanufacture it.

Presently, damaged stuffing boxes are repaired by boring out the inside diameter of the box to insure a smooth cylindrical surface, and press-fitting into the bore a machined insert that has the appropriate internal diameter.

The present method of reconditioning stuffing boxes and other members having cylindrical internal bores is not entirely satisfactory. The high-pressure fluid found within mud pumps has a tendency to squeeze between the press-fitted insert and the stuffing box, causing vortices that erode the contact surface and allow high-pressure fluid to escape.

SUMMARY OF THE INVENTION

It is therefore an object of the present invention to provide an apparatus and method that overcome the shortcomings of the prior art. More particularly, it is an object of the present invention to provide a method and apparatus for reconditioning the interior of a cylindrical member that deposits material upon the internal diameter of the member that is homogeneous therewith and has a surface hardness at least equal to the original specification.

Briefly stated, the foregoing and other objects of the present invention are accomplished by providing an apparatus and method for depositing material upon the interior surface of a cylindrical object by means of a gas-shielded electrode. The apparatus includes a mandrel adapted for supporting the object for rotation about its longitudinal axis. A wire-fed gas-shielded welding torch is supported adjacent to the interior surface of the member such that as a workpiece is rotated by the mandrel, material is deposited circumferentially about the interior thereof. The torch is supported for longitudinal movement with respect to the member in response to the rotation thereof, such that material is deposited axially therein.

The rate of gas delivery and wire feed are variable so as to provide the desired results. The speed of rotation of the mandrel is variable in order to control the width and depth of the material deposited. The speed by which the torch is moved axially with respect to the member may be varied depending upon the width of the material deposited by the torch.

DESCRIPTION OF THE PREFERRED EMBODIMENT

Figure 1:
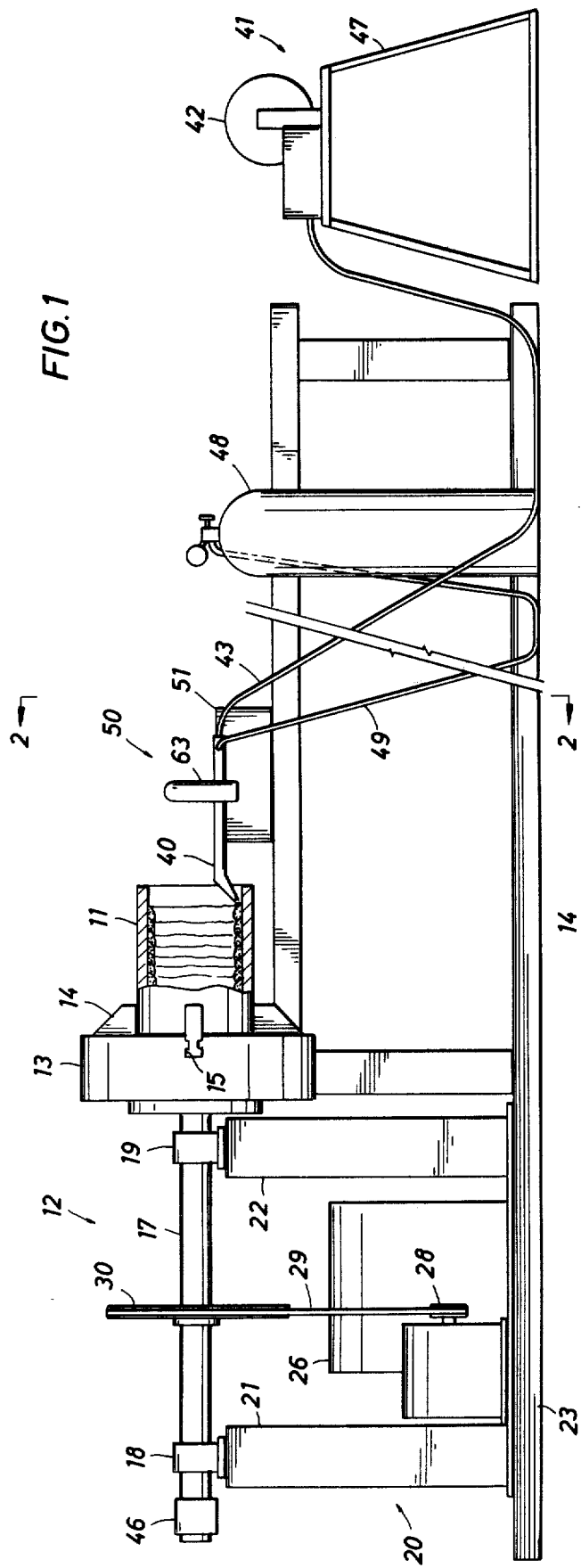
FIG. 1 is a side elevation view of the preferred embodiment of the invention showing the layout of the elements thereof.

Referring now to the drawings, the apparatus of the present invention is adapted for depositing material on the interior surface of a cylindrical member 11, and is comprised generally of means, designated generally by the numeral 12, for supporting member 11 for rotation about the longitudinal axis thereof, a wire-fed gas-shielded welding torch 40 and means, designated generally by the numeral 50, for supporting torch 40 for axial movement with respect to member 11.

Member support means 12 includes a mandrel 13 having, in the preferred embodiment, four jaws, each designated by the numeral 14, spaced circumferentially thereabout. Jaws 14 are contained within slots 15 in mandrel 13 so as to be movable radially with respect thereto in order to clamp and hold members 11 of varying external diameters for rotation about the longitudinal axis thereof.

Mandrel 13 is supported for rotation by a driveshaft 17 substantially rigidly connected thereto. Driveshaft 17 is supported for rotation about it axis by means of a pair of pillowblock bearings 18 and 19 that are fastened by bolts or the like to a support stand 20. Support stand 20 includes a pair of members 21 and 22 supported on angleirons 23 and 24 having a plate 25 therebetween.

Driveshaft 17 is rotated about the longitudinal axis thereof by means of a motor 26 supported on plate 25. The rotation of motor 26 is transmitted to shaft 17 by means of a variable-speed reducing gearbox 27 having a sprocket 28. An endless chain 29 transmits the rotation of sprocket 28 to a drivesprocket 30 that is connected to shaft 17. An idler sprocket 31 is provided to maintain the tension of endless chain 29.

Torch 40 is supplied with wire by means of wirefeed 41 supported on a stand 47. The wire, which is chosen to have a hardness equal to or greater than that specified for the interior of member 11, is supplied from a spool 42 to torch 40 through a flexible conduit 43 by means of a variable-speed wirefeeder 44 driven by motor 45. The rate of wire feed is determined by the rate at which material is to be deposited by torch 40 upon the interior of member 11. The higher the current that is flowed through the wire, the greater will be the rate of deposit. However, higher currents create more heat. Because of the confined nature of the interior of member 11, it is necessary to keep the heat generated to a minimum and therefore it is necessary to use the device with a minimum of current. The current is conducted to ground by means of a collector 46 on the end of shaft 17.

Torch 40 is shielded by a gas that is chosen according to the nature of the base metal of member 11 and the wire. The shielding gas is delivered to torch 40 from a bottle 48 by a hose 49. The rate of delivery of shielding gas is variable so that the proper amount of gas can be supplied to torch 40.

Torch 40 is supported adjacent to the interior of member 11 by torch support means 50. Torch support means 50 includes a variable-speed torchdrive 51 and a torch support arm 60.

Figure 2:
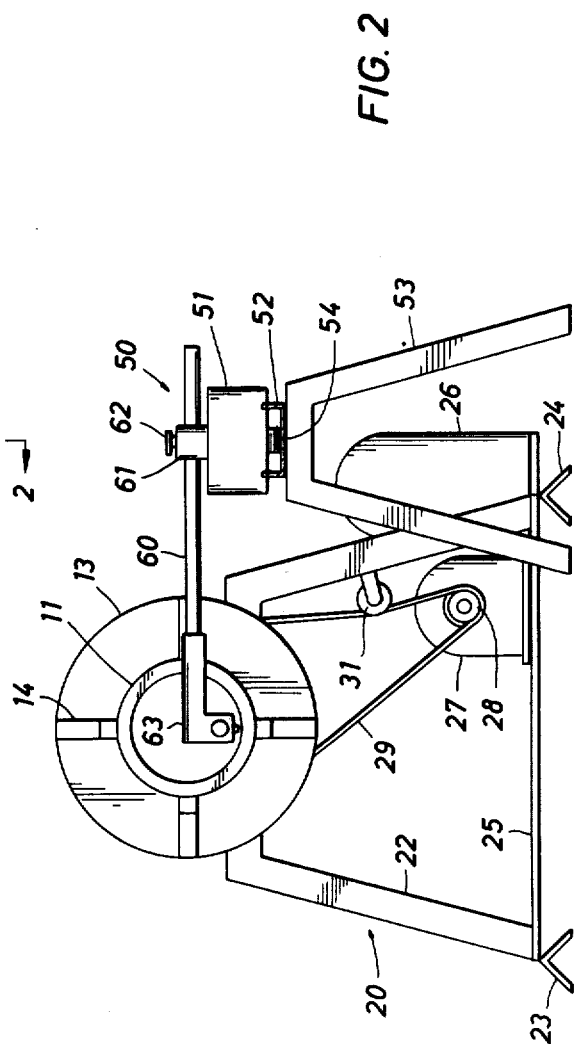
FIG. 2 is a sectional view along line 2—2 of FIG. 1 showing in greater detail the arrangement of the elements.

Carriage 51 is supported for movement axially with respect to member 11 on a pair of rails 52 supported on a stand 53. Carriage 51 has a motor (not shown) that, through a variable-speed gearing system (not shown) drives a wheel, as illustrated in FIG. 2. Wheel 54 is in contact with a surface 55 between rails 52. When carriage 51 is electrified, wheel 54 rotates to drive carriage 51 axially.

Figure 3:
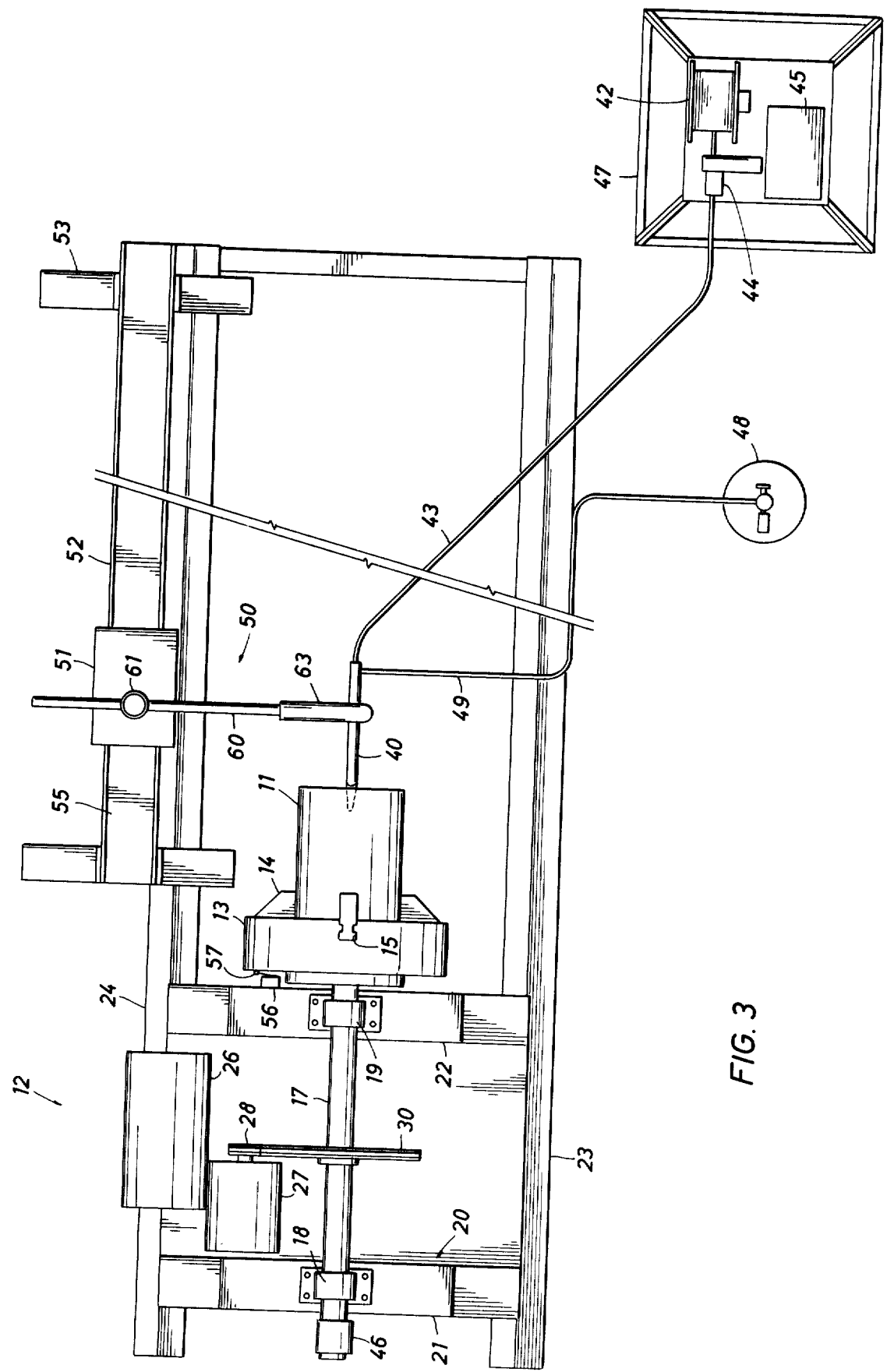
FIG. 3 is a top view again showing the arrangement of the elements.

Referring to FIG. 3, carriage 51 is electrified by means of a microswitch 56 supported adjacent to mandrel 13. Microswitch 56 is actuated by a cam member 57 on mandrel 13. During the rotation of mandrel 13, microswitch 56 is normally open; however, for a period of time, determined by the speed of rotation of mandrel 13, cam member 57 closes microswitch 56, which electrifies and causes axial movement of carriage 51.

Arm 60 is adapted for sideways movement with respect to carriage 51 by means of an armlength adjustment 61. Arm 60 is slidingly engaged through a hole (not shown) in armlength adjustment 61 and is held in place by a screw 62. Torch 40 is attached to arm 60 by a bracket 63.

As an example of the use of the apparatus of the present invention, consider the case where a cylindrical member 11, for example, an oilfield mud pump stuffing box, has been taken out of service because the interior thereof has become worn and eroded. The first step in the reconditioning process would be boring out the interior of member 11 so that the interior surface thereof would be smooth and truly cylindrical. The intermediate steps of the reconditioning process would be performed by the apparatus and in accordance with the method of the present invention.

Member 11 would first be mounted upon mandrel 13 and jaws 14 would be positioned so that member 11 and mandrel 13 are substantially coaxial. Torch 40 would then be positioned adjacent to the interior of member 11 by adjusting the length of arm 60. Carriage 51 is adapted for linear movement in either direction and therefore torch 40 may be positioned to advance into or retreat out of member 11.

With member 11 mounted on mandrel 13 and torch 40 positioned, a wire is chosen in order that the material deposited on the interior of member 11 will have a surface hardness equal to or greater than that specified for member 11. A shielding gas would be selected based upon the composition of the wire and the base metal of member 11.

Having selected the wire, the amount of current is chosen so as to keep to a minimum the heat generated by torch 40 within member 11. The current selected would then enable the operator of the apparatus to determine the rate of wire feed to torch 40.

With the rate of wire feed and, therefore, the rate of deposit of material determined, the operator would then set the speed of rotation of mandrel 13 by adjusting variable-speed gearbox 27. The speed of rotation of mandrel 13 controls the depth and width of the material deposited by torch 40. Having selected the speed of rotation of mandrel 13, the operator would set the speed of travel of carriage 51. Carriage 51 is normally stationary; however, once during each revolution of mandrel 13 microswitch 56 is closed momentarily which causes carriage 51 to move axially. The distance that carriage 51 moves is determined by the amount of time that microswitch 56 is closed and the speed at which carriage 51 is set to travel.

With the apparatus set up in the manner just described, the shielding gas would be turned on to deliver an appropriate gas volume. With the gas flowing at the appropriate rate, torch 40 and motor 26 would be actuated substantially simultaneously, thereby depositing a strip of material circumferentially about the interior of member 11. As cam 57 actuates microswitch 56, carriage 51 will move incrementally axially with respect to member 11 and torch 40 will deposit another bead of material within member 11. The operation of the apparatus will continue until the interior of member 11 is completely covered with material.

At the completion of the material deposition, torch 40 and motor 26 are deactuated and member 11 is removed from mandrel 13. The interior of member 11 is then remachined to the tolerances specified by the manufacturer.

It may thus be seen that the apparatus and method of the present invention enable one to recondition the interior of cylindrical members by depositing thereon material that is homogeneous therewith and at least as hard as is required by the original manufacturer's specifications. Of course, further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features may be utilized independently of the use of other features, all as would be apparent to one skilled in the art after having the benefit of this description of the invention.

What is claimed is:

1. Apparatus for depositing material on the interior surface of a cylindrical workpiece which comprises:

a mandrel having an axis of rotation;

means for supporting said workpiece coaxially with said mandrel for rotation therewith;

a wire-fed welding torch positionable on the interior of said workpiece adjacent to said interior surface of said workpiece;

means for moving said welding torch axially with respect to said workpiece, said axially-moving means including a carriage connected to said welding torch for movement therewith and electric means for moving said carriage axially with respect to said workpiece;

switch means for energizing said electric moving means;

and means on said mandrel for operating said switch means to move said welding torch.

2. The apparatus as claimed in claim 1, including means for gas shielding said welding torch.

3. The apparatus as claimed in claim 2, including means for varying the rate of delivery of gas to said gas shielding means.

4. The apparatus as claimed in claim 1, including means for varying the speed of rotation of said rotating means.

5. The apparatus as claimed in claim 1, including means for varying the speed of movement of said axially moving means.

6. The apparatus as claimed in claim 1, including means for varying the rate of wire feed to said welding torch.

7. The apparatus as claimed in claim 1, wherein said switch means is normally open such that said axially moving means is normally stationary.

8. The apparatus as claimed in claim 1 including a rail for supporting said carriage for axial movement with respect to said workpiece.

9. The apparatus as claimed in claim 1 wherein said electric moving means includes a motor driven wheel.

* * * * *